Patented Oct. 2, 1951

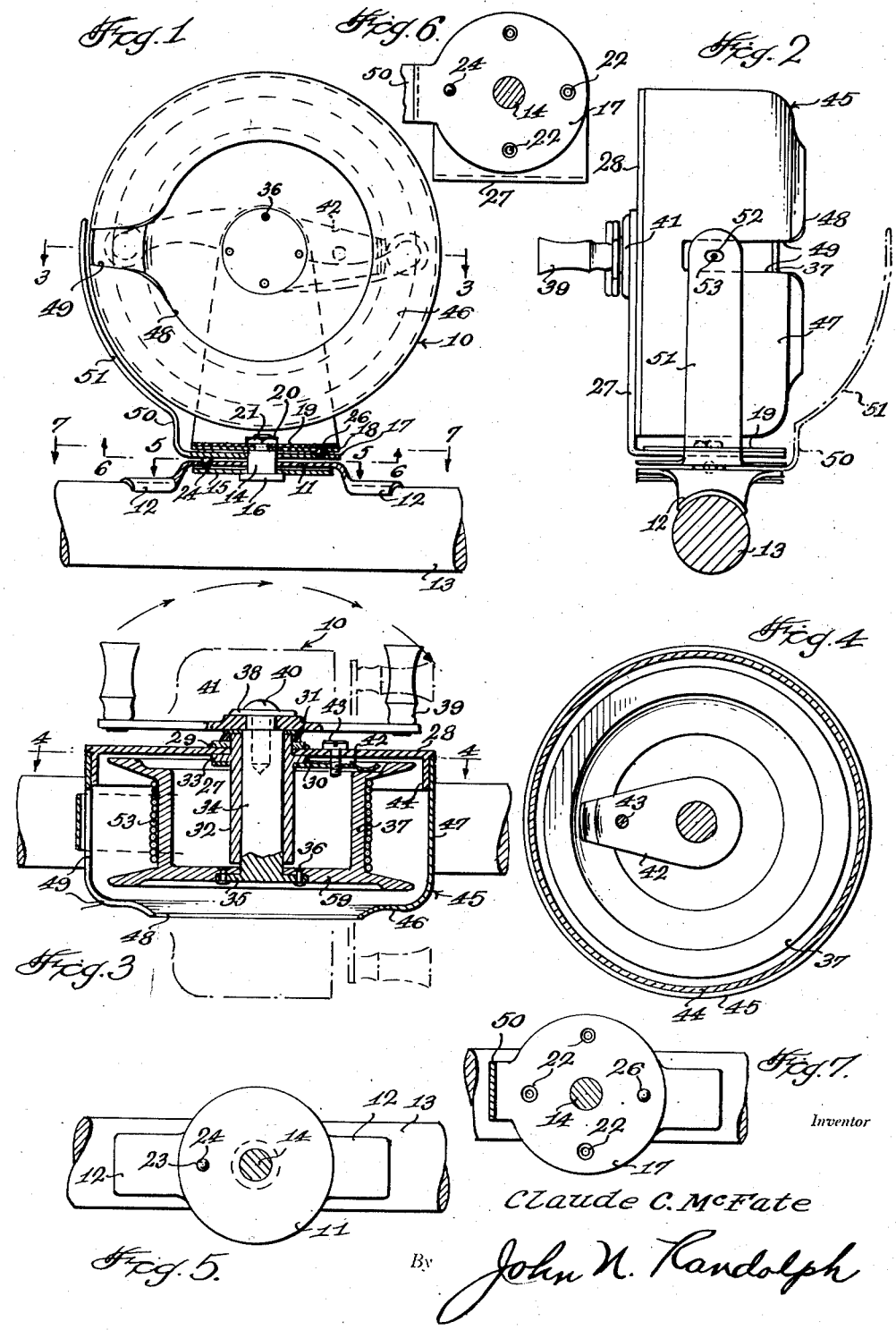

2,569,770

UNITED STATES PATENT OFFICE 2,569,770

CASTING REEL

Claude C. McFate, Denver, Colo.

Application September 7, 1948, Serial No. 48,047

3 Claims. (Cl. 242—84.1)

1

This invention relates to a novel construction of casting reel for use by fisherman to enable a fishing line to slide or spin off of a side of the reel spool when casting in lieu of the spool revolving and the line being payed off or unwound from the spool, to thereby eliminate backlashing of the line and to enable a longer and more accurate cast to be made.

More particularly, it is a primary object of the present invention to provide a reel having a novel case enclosing the spool and from which the line may be spun off of the spool from a side thereof through a side of the case for casting.

A further object of the invention is to provide a novel construction of reel capable of being used by either left-handed or right-handed fisherman.

Various other objects and advantages of the invention will hereinafter become more fully apparent from the following description of the drawing, illustrating one preferred embodiment thereof, and wherein:

Figure 1 is a side elevational view, partly in section showing the reel mounted on a portion of a fishing rod and in a retrieving position for use as a right-hand reel;

Figure 2 is an elevational view looking from left to right of Figure 1;

Figure 3 is a horizontal sectional view taken substantially along a plane as indicated by the line 3—3 of Figure 1;

Figure 4 is a sectional view of the reel taken substantially along a plane as indicated by the line 4—4 of Figure 3; and Figures 5, 6 and 7 are horizontal sectional views taken substantially along planes as indicated by the lines 5—5, 6—6 and 7—7, respectively, of Figure 1.

Referring more specifically to the drawing, the novel casting reel in its entirety is designated generally 10 and includes a reel supporting saddle 11 having downwardly off set transversely bowed end portions 12 which are adapted to rest upon a portion of a fishing rod 13 for positioning the saddle longitudinally of the rod, as illustrated in Figure 1. Suitable clamps, not shown, would be provided to engage the saddle portions 12 for detachably clamping them to the rod 13 in a conventional manner, not shown.

As seen in Figure 1, a hub 14 extends through a central opening in the intermediate portion of the saddle 11, which portion is preferably circular, as illustrated in Figure 5. A spring disk 15, preferably formed of spring metal, is disposed beneath the intermediate portion of the saddle 11 on the hub 14 and supported by a head 16 on the lower end of said hub. A substantially disk-shaped line guide base 17 is rotatably supported on the hub 14 above the saddle 11 and a similarly shaped reel bracket base 18 is rotatably disposed on the hub 14 above the line guide base 17. An upper resilient disk, preferably formed of spring metal, is disposed on the hub 14 above the base 18 and said latter disk 19 is retained in an applied position by a nut 20 which engages a threaded stem 21 constituting restricted upper extension of the hub 14. The guide base 17 is provided in both sides thereof with four equally spaced circumferentially arranged beveled recesses 22. The circular saddle portion 11 is provided with an opening 23 to receive a ball 24 which is urged upwardly by the resilient disk 15 for releasable engagement with one of the downwardly opening beveled recesses 22 and the base 18 is provided with an opening 25 for accommodating a ball 26 which is urged downwardly by the upper resilient disk 19 into engagement with one of the upwardly opening recesses of the base 17 so that the line guide base 17 with the reel base 18 may be swiveled on the hub 14 relatively to the saddle 11 in either direction and will be detachably latched with said parts disposed either longitudinally or transversely of the fishing rod 13 or the reel base 18 may be turned relatively to the line guide base 17 and will be latched by the ball 26 after movement through arcs of 90°.

The base 18 constitutes one end of an upstanding reel supporting bracket 27 which is disposed substantially at a right angle to its base 18 and which is fixedly secured to a fixed side 28 of the reel 10 in any suitable manner as by soldering or welding as indicated at 29. Said fixed reel side 28 is provided with a central opening 30 and preferably aligns with an opening 31 of the bracket 27 to receive an elongated sleeve or bushing 32 an end of which extends outwardly through said openings 30 and 31 and which is provided with an external flange 33 for engagement with the inner side of the reel side wall 28. A reel hub 34 is journaled in the bushing 32 and has a flanged inner end 35 which is disposed beyond the opposite, inner end of the hub 34 and which is secured by rivets or fastenings 36 to a reel spool 37. The hub 34 is provided with a non-circular opposite end 38 which is disposed beyond the first mentioned end of the bushing 32 for receiving the intermediate portion of a crank 39 having a non-circular opening for engagement therewith and which is detachably secured thereto by a screw 40 which extends into a threaded recess of the hub 34. Suitable washers 41 may be provided at the first mentioned, outer end of the bushing 32 to prevent the hub and bushing from reciprocating with respect to said reel wall 28. It will thus be readily apparent that the spool 7 is thus connected to the hub 34 and crank 39 to be revolved by said crank and it will be readily obvious that the reel side wall 28 could be thickened and recessed, if desired, to accommodate gearing which could be interposed between the hub 34 and crank 39 to cause the spool to revolve at a faster rate than the crank, as is conventional.

A leaf spring 42 is shown mounted on the bushing 32 and having an end for engagement with an annular portion of the spool 37. A screw 43 extends loosely through the reel wall 28 and through a threaded opening in the spring 42 for retracting said spring out of engagement with the annular portion of the spool 37 to permit the spool to revolve freely or for permitting the spring to bear against the spool 37 to function as a drag thereon.

The reel wall 28 is provided with an annular flange 44 which projects from the inner side thereof and is spaced from its periphery to receive a reel case or cover 45 having a side wall 46 normally disposed substantially parallel to the fixed wall 28 and an annular flange 47 extending from one side thereof and the outer end of which detachably and rotatably engages over the flange 44 for detachably and rotatably mounting the case or cover 45 thereon. The side wall 46 is provided with a relatively large substantially central opening defined by an outwardly flared flange portion 43 of said side wall 46 and the side wall portion 46 surrounding said opening 48 is flared outwardly with respect to the adjacent side of the spool 37, as best illustrated in Figure 3. The case flange 47 is provided with a slotted opening 49 which extends from adjacent the portion thereof engaged by the flange 44 in a direction transversely of the reel 10 and through a portion of the side wall 46 and communicates with a portion of the opening 48, as seen in Figures 2 and 3.

The line guide base 17 is provided with an outwardly offset upstanding portion 50 from which projects an upwardly extending outwardly bowed portion 51 which is curved to conform substantially to the curvature of the reel flange 47 and which is provided with an opening 52 adjacent its upper end which is disposed in substantially the same plane as the axis of the reel 10 and either in alignment with a portion of the slotted opening 49 formed by the flange 47 or in substantially axial alignment with the opening 48.

The reel 10 is illustrated as being mounted on the upper side of the fishing rod 13 but it will be obviously apparent that said reel could be mounted on the under side of the rod if desired for effecting a better balance of the rod as frequently occurs when employed with a casting or fly rod. A fishing line 53 is wound on the spool 37 in a conventional manner and has one end thereof extending outwardly through the line guide eye 52 and through the slotted opening 49 when the reel and guide are disposed in a retrieving position and as illustrated in full lines in Figures 1 to 3. With the reel and guide thus disposed, the line 53 can be retrieved in a conventional manner by operating the crank 39 to revolve the spool 37 in a direction for winding the line 53 thereon. To cast the line 53 from the spool 37, the reel 10 is turned relatively to the rod 13, saddle 11 and line guide 51 in a clockwise direction as seen in Figure 3 through an arc of 90° to its dotted line position of this figure so that the guide eye 52 will be axially aligned with the case opening 48. In this movement of the reel 10, the ball 26 slides out of engagement with its recess 22 as illustrated in Figure 7 and into engagement with the next recess 22 which is spaced a distance in a clockwise direction equal to 90°. The line 53 can then be cast off the outer side 54 of the spool 37 through the opening 48 and guide eye 52 without the spool 37 revolving and so that the line may thus spin off of the spool and without danger of resulting in a backlash. The guide eye 52 will prevent a large coil from forming in the line as it passes outwardly through the case opening 48 and which would otherwise strike the pole or the hand of the fisherman and thereby retard the cast. The case 45 by substantially enclosing the spool 37 eliminates any loose line about the spool as the cast is made. After the cast has been made, the reel 10 is returned to its full line positions of Figures 1, 2 and 3 so that the line can be retrieved. It will be readily apparent that the opening 48 of the case 45 will be facing toward the tip of the rod 13 when a cast is being made.

In lieu of turning the reel 10 relatively to the rod 13 for casting, the guide 51 may be turned counterclockwise as seen in Figure 3 to its dotted line position of Figure 2 from which position the line 53 may also be cast from the side of the reel through the case opening 48 and guide eye 52.

By turning the reel 10 relatively to the saddle 11, rod 13 and guide 51 in a clockwise direction through an arc of 180° and by rotating the case 45 on the flange 44 through an arc of 180° so that the slot 49 will again be positioned to face toward the tip of the rod 13, the reel may be utilized as a left-hand reel and may be turned for casting and retrieving as previously described and if desired the line may be wound in the opposite direction on the spool 37.

From the foregoing it will be readily apparent that a novel construction of casting reel has been provided through the use of which the line may be readily spun off of a side of the reel spool for accomplishing a cast without requiring rotation of the spool and thereby eliminating the possibility of backlash and which reel is adapted for use either as a right-hand or left-hand reel and is so constructed that by the provision of the line guide the possibility of a large coil forming in the line adjacent the reel is eliminated thereby enabling a longer and more accurate cast to be accomplished.

I wish it to be understood that I do not desire to be limited to the exact details of construction shown and described, for obvious modifications will occur to a person skilled in the art.

I claim as my invention:

1. A casting reel comprising an elongated reel saddle, a reel case, a spool rotatably mounted in the case, means for revolving said spool for winding a fishing line thereon, said case including an annular flange disposed around the periphery of the spool and a side wall facing one side of the spool, said side wall having a relatively large opening disposed beyond and centrally of said side of the spool, of a diameter less than the diameter of the spool, and a slotted opening extending from a portion of said enlarged opening having a part disposed in the annular flange of the case, and means swively supporting the reel case on the saddle whereby the case and spool are turnable as a unit from a retrieving position in a plane parrallel to the longitudinal axis of the reel saddle to a casting position crosswise of the reel saddle to permit the fishing line to spin off of the side of the spool adjacent said enlarged opening of the case and through said opening for casting the line from the reel while the spool is stationary, and a line guide having a base portion swively connected to and mounted on the reel saddle, said line guide having an eye disposed to align with the slotted portion of the annular flange or with the enlarged opening in the side wall of the case in either position of the reel relatively to the saddle, for guiding the line in its movement onto or off of the spool and to prevent large coils forming in the line during casting and adjacent the reel case.

2. A casting reel comprising an elongated reel saddle, a reel case, a spool rotatably mounted in the case, means for revolving said spool for winding a fishing line thereon, said case including an annular flange disposed around the periphery of the spool and a side wall facing one side of the spool, said side wall having a relatively large opening disposed beyond and centrally of said side of the spool, of a diameter less than the diameter of the spool, and a slotted opening extending from a portion of said enlarged opening having a part disposed in the annular flange of the case, and means swively supporting the reel case on the saddle whereby the case and spool are turnable as a unit from a retrieving position in a plane parallel to the longitudinal axis of the reel saddle to a casting position crosswise of the reel saddle to permit the fishing line to spin off of the side of the spool adjacent said enlarged opening of the case and through said opening for casting the line from the reel while the spool is stationary, and a line guide having a base portion swively connected to and mounted on the reel saddle, said line guide having an eye disposed to align with the slotted portion of the annular flange or with the enlarged opening in the side wall of the case in either position of the reel relatively to the saddle, for guiding the line in its movement onto or off of the spool and to prevent large coils forming in the line during casting and adjacent the reel case, said line guide having and arcuate outwardly bowed portion disposed substantially concentrically of a portion of the reel when the reel and guide are in retrieving position.

3. A casting reel comprising an elongated reel saddle, a reel case, a spool rotatably mounted in the case, means for revolving said spool for winding a fishing line thereon, said case including an annular flange disposed around the periphery of the spool and a side wall facing one side of the spool, said side wall having a relatively large opening disposed beyond and centrally of said side of the spool, of a diameter less than the diameter of the spool, and a slotted opening extending from a portion of said enlarged opening having a part disposed in the annular flange of the case and means swively supporting the reel case on the saddle whereby the case and spool are turnable as a unit from a retrieving position in a plane parallel to the longitudinal axis of the reel saddle to a casting position crosswise of the reel saddle to permit the fishing line to spin off of the side of the spool adjacent said enlarged opening of the case and through said opening for casting the line from the reel while the spool is stationary, and a line guide having a base portion swively connected to and mounted on the reel saddle, said line guide having an eye disposed to align with the slotted portion of the annular flange or with the enlarged opening in the side wall of the case in either position of the reel relatively to the saddle for guiding the line in its movement onto or off of the spool and to prevent large coils forming in the line during casting and adjacent the reel case, said line guide having an arcuate outwardly bowed portion disposed substantially concentrically of a portion of the reel when the reel and guide are in retrieving position, and spring latch means releasably retaining the reel and guide against rotation relatively to the reel saddle for retaining the reel and guide in either a casting position or a retrieving position.

CLAUDE C. McFATE.

REFERENCES CITED

The following references are of record in the file of this patent:

UNITED STATES PATENTS

| Number | Name | Date |
|---|---|---|
| 161,314 | Winans et al. | Mar. 23, 1875 |
| 1,621,003 | Dodd | Mar. 15, 1927 |
| 2,179,413 | Kolosso | Nov. 7, 1939 |
| 2,327,469 | Teitsma | Aug. 24, 1943 |